United States Patent [19]

LaPerre et al.

[11] 4,329,393

[45] May 11, 1982

[54] COATING COMPOSITIONS FOR RETROSPECTIVE IDENTIFICATION OF ARTICLES

[75] Inventors: James D. LaPerre, River Falls, Wis.; Donald L. O'Brien, St. Paul, Minn.

[73] Assignee: Minnesota Mining and Manufacturing Company, St. Paul, Minn.

[21] Appl. No.: 151,768

[22] Filed: May 21, 1980

[51] Int. Cl.$^3$ ............... C08K 3/40; C06B 29/60; B32B 5/16; B32B 9/00

[52] U.S. Cl. ............... 428/325; 149/2; 252/408; 102/376; 102/480; 102/513; 102/482; 523/172; 523/200; 523/217

[58] Field of Search ............ 260/37 EP, 37 R, 40 R, 260/37 N, 42.18, 42.21, 42.52, 42.22; 428/325, 913; 149/2; 102/60, 64, 38; 252/408

[56] References Cited

U.S. PATENT DOCUMENTS

| | | | |
|---|---|---|---|
| Re. 29,334 | 8/1977 | Ryan et al. | 149/2 T |
| 2,963,378 | 12/1960 | Palmquist et al. | 106/193 |
| 3,700,305 | 10/1972 | Bingham | 350/105 |
| 3,772,099 | 11/1973 | Ryan et al. | 149/18 |
| 3,772,200 | 11/1973 | Livesay | 252/301.1 R |
| 3,861,886 | 1/1975 | Meloy | 44/51 |
| 3,897,284 | 7/1975 | Livesay | 149/2 T |
| 3,958,041 | 5/1976 | Wagner | 260/42.21 |
| 3,967,990 | 7/1976 | Ryan et al. | 149/2 T |
| 4,013,490 | 3/1977 | Ryan et al. | 149/2 T |
| 4,029,506 | 6/1977 | Dessauer | 430/232 |
| 4,053,433 | 10/1977 | Lee | 242/408 |

FOREIGN PATENT DOCUMENTS 1568699  6/1980  United Kingdom .

OTHER PUBLICATIONS

Albert Mojonnier, "Pressure Fill or Cold Fill", May 1, 1956, pp. 49–50 and 85.

*Primary Examiner*—Herbert J. Lilling
*Attorney, Agent, or Firm*—Cruzan Alexander; Donald M. Sell; Carolyn A. Bates

[57] ABSTRACT

Coating compositions containing identifier particles are disclosed for the retrospective identification of articles. The compositions comprise a clear lacquer binder, visually-readable microparticles and reflective spotting particles. The reflective spotting particles facilitate location of the coating on the surface of the tagged article.

16 Claims, No Drawings

COATING COMPOSITIONS FOR RETROSPECTIVE IDENTIFICATION OF ARTICLES

TECHNICAL FIELD

This invention relates to new and useful liquid coating compositions for marking the surface of solid objects for retrospective identification. More specifically, the invention relates to compositions comprising a clear "lacquer" binder containing a plurality of tiny particles encoded with specific information.

BACKGROUND ART

In recent years, sophisticated law enforcement agencies have recognized the benefit of marking or tagging various types of bulk goods with tiny identifier particles. Such identifier particles or "microparticles" are designed to be imperceptible to the naked and untrained eye, but permit the bulk goods to be positively identified as to owner, manufacturer, lot number, etc. at some later date. If such tagged goods or items are diluted, adulterated, stolen, or illicitly-used, this fact can be readily determined and the guilty party more easily prosecuted. The most notable use of such microparticles has been in the manufacture of explosives. The microparticles are designed to survive detonation and can be retrieved from debris surrounding the blast.

U.S. Pat. Nos. 3,772,200, 3,772,099 and 3,861,886 describe various types of microparticles designed for tagging bulk goods such as explosives. In general, rather sophisticated instrumentation such as a microprobe analyzer or spectroscope is required to decipher the code which is built into these particles. In other words, the code is not visually readable, and a particle must be removed from the tagged substance and subjected to instrumentational analysis in order to decipher the code, often at a site remote from the area where the particles are retrieved.

A significant improvement in the aforementioned microparticles is disclosed in U.S. Pat. No. 4,053,433. This improvement relates to particles encoded with an orderly sequential arrangement of visually-distinguishable colored segments. The code of these microparticles can be read visually at the site of retrieval with the aid of a simple microscope or magnifying glass. The advent of such color-coded microparticles significantly expanded the use of microparticles because sophisticated readout equipment was eliminated. Improved color-coded microparticles (over those disclosed in U.S. Pat. No. 4,053,433) are described in German Offenlegungsschrift No. 26 51 528. These microparticles are irregularly-shaped and economically prepared by random comminution of brittle laminates formed of colored-layers laid down in a predetermined sequence to constitute the code. Because the code of these microparticles could be read visually with a simple hand-held magnifying glass, it was no longer necessary to separate the particles from the tagged goods, and the microparticles could be used to label the surface of solid objects, as by permanently attaching the particles to the surface with a clear lacquer. In this way, items of personal property such as hand tools, maintenance equipment, vehicles, machinery, etc. could be easily labeled by painting or spraying a transparent liquid composition containing the microparticles onto a small surface area of the item. Such a tagging method works well for retrospective identification purposes once a tagged object has been located and the area where the microparticles have been deposited is determined. However, because the microparticles are substantially indiscernable under normal viewing conditions, a problem was encountered in determining quickly and easily whether or not an object was tagged, particularly if one wished to make such a determination from even a slight distance from the object.

Accordingly, a need has developed for a transparent coating for adhering microparticles to a surface which is indiscernable by normal visual inspection, yet quickly and easily discernable by one who is trained to detect its presence on the object. The compositions of the present invention uniquely meet the aforementioned need by providing coatings containing spotting particles which render the tagged surfaces readily identifiable when a beam of light is focused on the object.

DISCLOSURE OF INVENTION

According to the present invention there is provided a coating composition for retrospective identification of articles comprising a clear lacquer binder containing a plurality of visually-readable microparticles and reflex-reflective glass beads in an amount which does not mask the code on the microparticles.

The term "lacquer binder" as used herein refers to a solution or dispersion of a resin in a vehicle which dries by evaporation and leaves an adherent film on the surface to which it is applied. "Visually-readable microparticles" refers to tiny particles, usually less than about 1000 micrometers at their broadest dimension, which bear a code or indicia of information which is readable by the normal human eye with the aid of a simple magnifying device. The term "reflex-reflective glass beads" as used herein refers to beads which reflect light back toward the light source so as to make their presence on a surface readily apparent to the eye when a light is focused directly on them.

The labeling compositions of the invention are preferably applied to surfaces by spray application, but other methods of application e.g., brushing, wiping, etc. are suitable.

To use, a small amount of the labeling composition is applied to the surface of the article to be tagged, for example, the handle of a tool. The coating should be substantially indiscernable under normal viewing conditions. Subsequently, as during a security check, the focusing of a beam of light on the article shows the exact location of the label, if present, by the reflection from the reflective spotting particles. Once the article is determined to be labeled and the location of the label on the surface of the article is ascertained, positive identification of the article is easily made using a magnifying device to isolate and read the code on a microparticle.

DETAILED DESCRIPTION

The type of lacquer binder used in the compositions of the invention is not critical so long as it provides a substantially transparent coating and is sufficiently adherent to securely attach the microparticles and the spotting particles to a surface. The coating must be transparent in order to: (1) allow light beams to be focused on, and reflected by, the reflective particles; and (2) read the code from the microparticles. The binder is also preferably colorless so as not to obscure the code if color-coded microparticles are used. A transparent and colorless binder is also desirable in order to render the coating substantially indescernable under normal viewing conditions.

Examples of resin systems which will form suitable transparent coatings include acrylate copolymers, polyurethanes, polyamide-modified alkyds, polyesters, ethylene vinyl actate copolymers, and epoxies. Selection of a resin system will depend, in part, upon the type of surface coated. For porous surfaces such as wood or painted metal, acrylate copolymers, e.g., methyl acrylate/ethyl methacrylate copolymer, work well. For unpainted metal surfaces or other surfaces where adhesion may be a problem, adhesion promoters such as silanes with functional groups such as acrylate, epoxy or amine groups are useful. For surfaces having a high thermal coefficient of expansion, more elastomeric resin systems such as polyurethanes may be desirable. Choice of vehicle is determined by the type of resin system, e.g., solution or dispersion, and the mode of application.

Optimum binder concentration (% solids) will vary depending on the particular resin system and may differ slightly between spray and brush-on formulations. In general, for spray application, binder concentrations below about eight percent produce a dried coating which is too thin to hold the microparticles and reflective particles on the surface of the article tagged. For brush application, the minimum binder concentration is also about 8 percent. The maximum binder concentration will depend on the molecular weight of the resin and solution viscosity. The maximum binder concentration is about 20 percent for spray application (e.g., viscosity $\leq$ 500 cps) and 30 percent for brush application. On a dry weight basis, the resin is preferably 72 to 88 percent of the total composition for aerosol spray compositions and 79 to 93 percent for brush-on compositions.

The preferred microparticles for use in the compositions of the invention are the color-coded microparticles disclosed in German Offenlegungsschrift No. 26 54 528. These microparticles are comprised of at least three visually-distinguishable colored layers and measure about 15 to 1,000 micrometers across the color sequence. The particles are produced by the random comminution of brittle laminates formed from individual colored layers laid down in a predetermined sequence to constitute a code. The microparticles are characterized as having two generally flat and parallel surfaces, and irregular broken edges or surfaces across the color sequence. Other visually readable microparticles include those described in U.S. Pat. No. 4,053,433 and copending application Ser. No. 67,931 filed Aug. 20, 1979.

The concentration of microparticles in the compositions of the invention is preferably held to a minimum to insure that the coating is not easily noticed under normal viewing conditions. Since the location of a single microparticle is sufficient to read the code, a high concentration of microparticles is unnecessary. Generally, the microparticles will be present in an amount between 0.2 and 1.2 percent, and preferably about 0.5 percent, of the total weight of the composition. On a dry weight basis, the microparticles will constitute from about 1.5 to 8 percent of the dry weight of the compositions. Spray formulations, which usually result in a more dispersed coating, will generally require a higher concentration of microparticles than brush-on formulations.

In the case of aerosol spray formulations microparticles of relatively small size, e.g., less than 200 micrometers and, preferably, less than 100 micrometers, must be used in order to prevent clogging of the valve mechanism. To provide microparticles in the appropriate size range for aerosol spray cans, larger microparticles (−30 mesh) of the type disclosed in German Offenlegungsschrift No. 26 51 528 (melamine-alkyd) are further ground by slowly feeding them into a Wiley Mill (fixed and rotary blades at about 3 mils or 76.2 micrometers) filled with a fine screen containing 10 mil (254 micrometers) openings. The resulting fines are sifted through a U.S. Standard sieve of 200 mesh (nominal 75 micrometer) openings and collected on a 325 mesh (nominal 45 micrometer) screen. The yield of suitably-sized microtaggants by this process is approximately 10–15 percent. The coarse particles (+200 mesh) can be reground several times to increase total yield. The resulting −200+325 fraction still contains electrostatically-clinging fines which can be removed by slurrying in methanol and decanting. The fines sink at a slower rate and can be almost completely separated by slowly pouring off the supernatent liquid after agitation. The remaining cake is dried at 50° C. for 15 minutes or until free-flowing.

The preferred reflective spotting particles for use in the compositions of the invention are reflective glass beads such as those described in U.S. Pat. No. 2,963,378. Each bead is a tiny glass sphere or spheroid which is transparent and reflectorized over approximately half its area, conveniently with a thin metallic reflector coating, such as a coating of aluminum, forming an integral hemispherical reflector cap. These hemispherically reflectorized microspheroids may be generally designated as "reflex-reflecting." That is, they possess a suitable combination of a lens and a back reflector (upon which incident light rays are brought to approximate focus) to return the reflected light rays in a cone back toward the source of light, even when the incident rays are at a substantial angle to the optical axis.

In the compositions of the invention, reflective beads in the size range of from 10 to 60 micrometers in diameter are most useful. For aerosol spray formulations, reflective beads in the range of 10–50, and preferably below 45, micrometers in diameter are suggested to minimize valve-clogging problems.

Reflective glass beads generally comprise between 0.5 and 5 percent of the total weight of the compositions. Below about 0.5 percent, the density is too low to facilitate detection. Above about 5 percent, the reflex reflection of the coating tends to become discernable under normal viewing conditions and masks the code on the microparticles.

Reflective beads having an index of refraction between 1.9 and 2.8 are preferred for use in the compositions of the invention. Beads having a refractive index of about 1.9 are suitable for spray formulations where a relatively thin coating of resin is formed leaving part of the bead exposed to the air. When the exposed bead is wetted with water, maximum reflex-reflection is achieved with beads having a refractive index of about 2.5. When the bead is totally embedded in the resin coating, as may occur to some extent with brush-on formulations, beads having a refractive index approaching 2.8 are preferred. Accordingly, to provide a coating exhibiting high reflex reflection under a variety of conditions, a composition having a mixture of beads (e.g., 50% of 1.9 index beads, 25% of 2.5 index beads and 25% of 2.8 index beads), may be desirable.

Other reflecting spotting particles such as uncoated, transparent glass beads having a high index of refraction, e.g., 1.9 to 2.5, or glass beads having a multi-layer specular reflective coating on a hemispheric portion thereof (U.S. Pat. No. 3,700,350) are contemplated within the scope of the invention. However, the brightness of reflection is greatly reduced with such particles, and generally, a more intense light at a closer distance is required for adequate spotting.

Other ingredients optionally incorporated into the compositions of the invention include a suspending aid such as amorphous silica. A suspending aid is preferred to prevent the high density microparticles and reflective spotting particles from settling rapidly, thus insuring a uniform coating. The concentration of silica is preferably between 0.5 and 1.5 percent by weight of the total composition (3 to 8 percent of dry solids). Below about 0.5 percent, the antisettling properties are reduced, requiring constant shaking or stirring of the composition in order to deliver a uniform distribution of microparticles and spotting particles to the item tagged. Above about 1.5 percent, the ratio of silica to resin is too high and can result in mudcracking, i.e., the coating shrinks unevenly during drying.

To aid in the detection of the coating location on the article surface, it is sometimes advisable to incorporate a fluorescing agent such as an optical brightener into the lacquer coating. A suitable example of an optical brightener is 7 diethyl amino-4-methyl coumarin at about 0.02 percent by weight of the coating formulation. Under the presence of long wave ultraviolet light, this optical brightener appears blue-violet in color. However, unlike the reflex-reflecting beads, the optical brightener is not stable to sunlight.

The following is an example of a typical composition of the invention for application by aerosol spraying: (amounts are given in parts by weight)

12.0% Rohm & Haas Acryloid B-72 (methyl acrylate/ethyl methacrylate copolymer
0.74% Cabot Cabosil EH-5 (an amorphous fumed silica)
0.43% Microtaggants ® (−200+325 mesh) 3M Company
1.71% Reflex Reflecting Spheroids, 10-60 m (hemispherically-coated with aluminum)
59.4% Toluene (vehicle)
Propellants:
5.72% Propane
20.0% Isobutane A suitable aerosol valve system for applying the above composition to the surface of an object is described as follows:

Valve Specification:
  *Precision
    Valve body 07-1901
    Stem -1-1220
    Stem Gasket Neoprene 05-0330
    Dip Tube 09-2010
    Spring 06-6010 (stainless)
Actuator:
  Precision (01-07-06) −0.18" orifice
Extension Tube:
  Precision 11-5006 −0.025" orifice cut into 2" lengths and inserted in actuator (the extension tube helps in aiming the spray).

*Precision Valve Company, 2930 N. Ashland Avenue, Chicago, Ill. 60651

The following Tables I and II provide a comparison between typical aerosol spray and brush-on formulations. The resin system selected works particularly well for coating porous surfaces such as wood. It also has the advantage of being useful for both spray and brush-on formulations.

TABLE I (Aerosol)
Preferred Solids Range 8-20%

|  | (% of total) | (% of dry wt) | Preferred Range (% of dry wt) |
|---|---|---|---|
| Resin[1] | 12% | 80.6% | 72.5-87.5% |
| Reflective Beads[2] | 1.71 | 11.5 | 7-15 |
| Microparticles[3] | .43 | 2.9 | 1.5-4.5 |
| Antisettling Agent[4] | .74 | 5.0 | 3-8 |
|  |  | 100% |  |
| Solvent[5] | 59.4 |  |  |
| Propellant[6] | 25.72 |  |  |
|  | 100% |  |  |

TABLE II (Brush-On)
Preferred Solids Range 18-30%

|  | (% of total) | (% of dry wt) | Preferred Range (% of dry wt) |
|---|---|---|---|
| Resin[1] | 20.0% | 89.4% | 79-93% |
| Reflective Beads[2] | 1.2 | 5.4 | 3-10% |
| Microparticles[3] | .43 | 1.9 | 1-3% |
| Antisettling Agent[4] | .74 | 3.3 | 3-8% |
|  |  | 100% |  |
| Solvent[5] | 77.63 |  |  |
|  | 100% |  |  |

[1]Rohm & Haas Acryloid B-72 (an acrylate copolymer)
[2]Reflex Reflecting Speroids, 10-60 μm (hemispherically-coated with aluminum)
[3]Microtaggants ® (3M Company) −200+325 mesh 7 layer, 71 μm total thickness prior to grinding
[4]Cabot Co. Cabosil EH-5 (an amorphous fumed silica)
[5]Toluene
[6]5.72% Propane 20.00% Isobutane In applying the labeling compositions of the invention to the surface of an article, it is recommended that the labeled area be a region containing crevices or indentations. The microparticles and spotting particles will become embedded in the crevices and be less noticeable under normal viewing conditions. Also, microparticles embedded in crevices will be more difficult to remove by abrasion. Examples of the desirable labeling areas are crevices associated with the joining of a wood handle to a metal tool head, or the stamped or formed letters in a tool handle. On larger articles, it is preferred to label the articles on different sides so that the location of the label is identifiable from any side viewed.

What is claimed is:

1. A coating composition for retrospective identification of articles comprising a clear lacquer binder containing a plurality of visually-readable microparticles and reflex-reflective glass beads in an amount which does not mask the microparticles.

2. The composition according to claim 1 wherein said lacquer comprises an acrylate copolymer.

3. The composition according to claim 1 wherein said microparticles contain a color code.

4. The composition according to claim 3 wherein each of said microparticles comprises at least three visually-distinguishable colored layers and measures between about 15 and 1000 micrometers across the color sequence, said microparticles having two generally flat and parallel surfaces and irregular broken edges across the color sequence.

5. The composition according to claim 3 wherein said microparticles are present in an amount between 0.2 and 1.2 percent by weight of said composition.

6. The composition according to claim 1 wherein said reflex-reflecting glass beads having a refractive index between about 1.9 and 2.8.

7. The composition according to claim 6 wherein said glass beads are hemispherically reflectorized with a thin metallic coating.

8. The composition according to claim 6 wherein said glass beads range in size from about 10 to 60 micrometers.

9. The composition according to claim 6 wherein said glass beads are present in an amount between about 0.5 and 5 percent by weight of said composition.

10. The composition according to claim 1 further comprising a suspending aid.

11. The composition according to claim 10 wherein said suspending aid comprises amorphous silica.

12. The composition acording to claim 1 formulated for application to a surface by spraying.

13. The composition acording to claim 12 wherein said microparticles are less than 200 micrometers at their broadest dimension.

14. The composition according to claim 12 further comprising aerosol propellants.

15. The composition according to claim 14 wherein said propellants comprise a mixture of propane and isobutane.

16. A method of labeling an article for retrospective identification comprising applying to the surface of said article a coating composition according to claim 1.

* * * * *